United States Patent [19]
Forsberg

[11] Patent Number: 5,961,679
[45] Date of Patent: Oct. 5, 1999

[54] RECOVERY OF FISSILE MATERIALS FROM NUCLEAR WASTES

[75] Inventor: Charles W. Forsberg, Oak Ridge, Tenn.

[73] Assignee: U. S. Department of Energy, Washington, D.C.

[21] Appl. No.: 08/964,761

[22] Filed: Nov. 5, 1997

[51] Int. Cl.[6] .................................................. G21F 9/00
[52] U.S. Cl. ........................... 65/134.8; 588/12; 588/201; 588/253
[58] Field of Search ................................ 588/11, 12, 252, 588/256, 13, 14, 201; 65/134.8

[56] References Cited

U.S. PATENT DOCUMENTS

| | | | |
|---|---|---|---|
| 4,501,691 | 2/1985 | Tanaka et al. ........................... | 252/631 |
| 4,514,329 | 4/1985 | Wakabayashi et al. .................. | 252/629 |
| 4,549,985 | 10/1985 | Elliott ..................................... | 252/631 |
| 4,595,528 | 6/1986 | Greenhalgh ............................. | 252/629 |
| 4,774,026 | 9/1988 | Kitamori et al. ....................... | 252/627 |
| 4,880,506 | 11/1989 | Ackerman et al. ...................... | 204/1.5 |
| 5,461,185 | 10/1995 | Forsberg et al. ........................ | 588/11 |
| 5,530,174 | 6/1996 | Kawamura et al. ..................... | 588/12 |
| 5,613,241 | 3/1997 | Forsberg et al. ........................ | 588/11 |
| 5,708,958 | 1/1998 | Koma et al. ............................. | 423/8 |

OTHER PUBLICATIONS

Benedict, et al., Nuclear Chemical Engineering, McGraw–Hill, Inc., New York, pp. 461–463, 466–469, 1981 (No Month Available).

Jensen et al, Recovery of Noble Metals from Fission Products, Nuclear Technology, vol. 65, pp. 305–324, May 1984.

C. W. Forsberg et al., "Conversion of Radioactive and Hazardous Chemical Wastes into Borosilicate Glass Using the Glass Material Oxidation and Dissolution System", Waste Management, vol. 16, No. 7, pp. 615–623, 1996. (No Month Available).

Charles W. Forsberg, "Recovery of Fissile Materials from Plutonium Residues, Miscellaneous Spent Nuclear Fuel, and Uranium Fissile Wastes", paper presented at the 1997 Annual Spring Meeting American Institute of Chemical Engineers, Houston, Texas, Mar. 9–13, 1997.

Primary Examiner—Stanley S. Silverman
Assistant Examiner—Sean Vincent
Attorney, Agent, or Firm—Virginia B. Caress; William R. Moser; Paul A. Gottlieb

[57] ABSTRACT

A process for recovering fissile materials such as uranium, and plutonium, and rare earth elements, from complex waste feed material, and converting the remaining wastes into a waste glass suitable for storage or disposal. The waste feed is mixed with a dissolution glass formed of lead oxide and boron oxide resulting in oxidation, dehalogenation, and dissolution of metal oxides. Carbon is added to remove lead oxide, and a boron oxide fusion melt is produced. The fusion melt is essentially devoid of organic materials and halogens, and is easily and rapidly dissolved in nitric acid. After dissolution, uranium, plutonium and rare earth elements are separated from the acid and recovered by processes such as PUREX or ion exchange. The remaining acid waste stream is vitrified to produce a waste glass suitable for storage or disposal. Potential waste feed materials include plutonium scrap and residue, miscellaneous spent nuclear fuel, and uranium fissile wastes. The initial feed materials may contain mixtures of metals, ceramics, amorphous solids, halides, organic material and other carbon-containing material.

20 Claims, 2 Drawing Sheets

RECOVERY OF FISSILE MATERIALS FROM NUCLEAR WASTES

This invention was made with Government support under contract DE-AC05-96OR22464 awarded by the U.S. Department of Energy to Lockheed Martin Energy Research Corporation, and the Government has certain rights to this invention.

BACKGROUND OF THE INVENTION

There is a need to develop new methods for (1) the economic and environmentally acceptable recovery of uranium, plutonium, and certain other elements from radioactive, complex waste mixtures and (2) the conversion of the residual wastes to borosilicate waste glass. There is an economic incentive for recovery of expensive materials for reuse. The wastes must be converted into an environmentally acceptable waste form. Borosilicate glass is the preferred radioactive waste form worldwide. The removal of plutonium, enriched uranium, and high-enriched uranium (HEU) from some of these wastes may be required to make the waste acceptable for disposal. Because plutonium, enriched uranium, and HEU can cause safeguard problems and nuclear criticality problems for disposal sites, they may not be acceptable in high concentrations in final waste forms. Examples of materials containing plutonium and uranium include:

a. Uranium Fissile Wastes

Gaseous diffusion enrichment plants and certain fuel fabrication facilities have significant quantities of wastes with substantial quantities of enriched uranium. Criticality and safeguards issues may prevent disposal as low-level radioactive waste. Separation of the enriched uranium would create a saleable product and a low-level waste that can be disposed of.

b. Miscellaneous Spent Nuclear Fuels (SNFs)

Many of these SNFs are probably not acceptable for repository disposal because (1) over long periods of time the HEU may cause nuclear criticality in a geological repository, and (2) the chemical forms of the SNF are not suitable for long-term disposal. This SNF must be processed into an acceptable waste form. Most of these SNFs contain HEU that, if separated from the SNF, can be blended down with low-enriched uranium to produce valuable fuel for nuclear power reactors. Other materials included in this category are miscellaneous hot-cell wastes. Many of these wastes are from destructive analysis of SNF assemblies. The chemical variability of hot-cell wastes is much greater than for miscellaneous SNFs.

c. Plutonium Scrap and Residue

These materials are highly toxic. There are safeguard issues associated with the storage of such materials. Moreover, some of the materials are in chemically unstable forms that are unlikely to be acceptable for disposal. Plutonium is in excess supply; but if it can be recovered, the residuals minus the plutonium can be disposed of as transuranic waste, and the plutonium can then be put into special forms for long-term storage or disposal.

Many methods for recovering plutonium and uranium have been developed but these methods have difficulties in processing complex waste streams. Historically, it has often been uneconomical to recover these elements just for their value. In most cases in the past, these wastes have been placed in storage to be treated at some later time. However, this is no longer an acceptable policy.

The traditional approach to recovering plutonium and uranium from feed streams is to (1) dissolve the material in acid; (2) recover the desired elements from the acid by solvent extraction, ion exchange, or precipitation; and (3) convert the waste stream to an acceptable waste form—usually borosilicate glass. In recent years, nitric acid has been the preferred dissolution acid because it can be destroyed after its use, thus yielding gaseous nitrogen and oxygen while producing no additional waste. The best known of the separation processes is the PUREX process. The Plutonium Uranium Extraction Process (PUREX) is used for recovery of uranium and plutonium from various feed stocks. In the process, the feed is dissolved in nitric acid. The plutonium in the acid is in the +4 valence state while the uranium is in the +6 valence state as the $UO_2^{+2}$ ion. The aqueous acid stream is contacted with an organic stream with an organic solvent (such as kerosine) containing tributylphosphate. The organic does not dissolve into the aqueous stream and the aqueous stream does not dissolve into the organic stream. The uranium and plutonium are selectively extracted from the aqueous stream to the organic stream.

The organic stream is then contacted with a second nitric acid stream containing a reducing agent such as ferrous ion or hydroxylamine. The plutonium in the +4 valence state is converted to plutonium in the +3 valence state and extracts from the organic stream into the second aqueous stream. This second aqueous stream is relatively pure plutonium nitrate in an acid stream. Last, the organic stream is contacted with water. The uranium is extracted from the organic to the water producing a product uranium nitrate dissolved in water. The organic is recycled back to the beginning of the process to remove more plutonium and uranium from the acid feed. The base technology is efficient and economical when processing clean, oxide-like materials that dissolve quickly in nitric acid. This technology is used worldwide on an industrial scale. Unfortunately, there are major limitations with the technology which make it unsuitable in its current configurations for processing many waste streams. Some of the disadvantages are:

a. Many metals and high-fired ceramics cannot be dissolved by nitric acid at acceptable rates. Dissolution of waste materials can usually (but not always) be achieved by the total dissolution of such materials in a mixture of hydrofluoric and nitric acids followed by recovery of the desired elements from solution. This process adds fluorides into the waste stream which, in turn, create major additional disposal problems including major increases in waste volumes and poor-quality waste forms. For highly radioactive wastes, it is the extra costs to handle the higher waste volumes that often make this option prohibitively expensive.

b. The presence of organics, other carbon-containing materials, or halides in feeds complicates the recovery of the desired elements and disposal of the waste acid streams after extraction of the product. The acid waste streams cannot be easily converted to an acceptable waste form (e.g., glass) if they contain organics, metals, or halides. If the waste acid stream contains such materials, these materials must often be removed before conversion of the acid waste to glass. Glasses are made from oxide or oxide like materials.

A second class of wastes contain valuable elements worth recovery—rare earths. "Rare earths", as used herein, is intended to encompass the elements in the periodic table having atomic numbers 57–72, and will also be referred to as rare earth metals. Rare earths are used in electronic display screens and other applications. Currently, no good, economically viable recovery options exist for recovering these materials from manufactured products. Rare earths found in natural ore deposits are not extremely expensive. However, separating specific rare earths from complex rare earth mixtures is expensive. As a consequence, there is an incentive to recover rare earths from specific industrial waste streams or other waste material where only one or two rare earths are in the wastes.

Accordingly it is an object of the present invention to provide an improved method of converting complex nuclear waste into a form from which fissile materials may be easily recovered.

Another object of the invention is to provide a method by which rare earth metals can be easily recovered from complex nuclear waste materials, industrial waste or any other waste material.

A further object of the invention is to provide a method by which uranium (U) and plutonium (Pu) can be separated and recovered from complex nuclear waste materials.

It is another object of the invention to convert complex nuclear waste mixtures, industrial waste or other waste material into a borate fusion melt which is easily dissolvable in nitric acid, and from which U, Pu, and rare earth metals can be easily recovered.

It is yet another object of the invention to easily and economically recover U, Pu, and rare earth elements from complex nuclear waste or other waste materials, and to convert the waste remaining to a waste glass suitable for storage or disposal.

SUMMARY OF THE INVENTION

Accordingly the present invention addresses the problems relating to the process of recovering U, Pu and rare earth elements from radioactive or industrial waste. As used herein, the term "radioactive waste" or "nuclear waste" is to be understood to include not only radioactive material per se which requires disposal, but to include miscellaneous attendant materials such as metal and/or carbon assemblies, cladding, ceramics, amorphous solids, and organic solids including various polymeric materials. The plutonium and uranium may be in the form of metals, compounds, or encapsulated in some form in a metal such as in steel.

One embodiment of the invention comprises the steps of:

providing a bath of molten boron oxide, $B_2O_3$, and lead oxide, PbO, wherein a molten dissolution glass comprising $xPbO:B_2O_3$ is formed;

adding nuclear waste feed material to the molten dissolution glass to form a molten dissolution glass/waste mixture; wherein metals (except noble metals) which were in the waste are oxidized and the resultant metal oxides are dissolved into the molten mixture, molten lead is formed and separates from the glass/waste mixture, noble metals dissolve into the molten lead, the lead sinks to the bottom of the melter, halogen-containing compounds which were in the waste are converted to gaseous lead halides, and carbon-containing compounds (e.g. organic material) are oxidized to form carbon oxides and water;

separating the gaseous halides from the molten mixture and contacting the gases with an aqueous scrubber solution of an alkali metal hydroxide to yield a soluble alkali metal halide and a lead-containing precipitate;

returning the lead-containing precipitate from the scrubber to the molten glass/waste mixture;

separating the molten lead, which contains dissolved noble metals, from the glass/waste mixture, and recovering the noble metals from the molten lead;

adding carbon to the molten glass/waste mixture to remove lead oxide by converting it to lead and carbon oxides, wherein a boron oxide fusion melt is formed, essentially devoid of halides and organic material or other carbon containing material;

dissolving the boron oxide fusion melt, which may contain U, Pu, and rare earth metals, in nitric acid; and separating and recovering U, Pu and rare earth metals from the acid solution.

The remaining acid solution, which may contain metal oxides, may then be converted to a glass suitable for storage or disposal by adding a glass frit such as $SiO_2$ or other glass forming materials known in the art. Some of the glasses suitable for storage or disposal of radioactive materials include borosilicate glasses, silica glasses, glass-ceramics, and polymeric aluminum phosphate glasses, and mixtures thereof.

The initial steps of the process are similar to the Glass Material Oxidation and Dissolution System (GMODS) disclosed in U.S. Pat. No. 5,613,241 (Forsberg et al.), incorporated herein by reference.

DETAILED DESCRIPTION OF THE INVENTION

Figure 1:
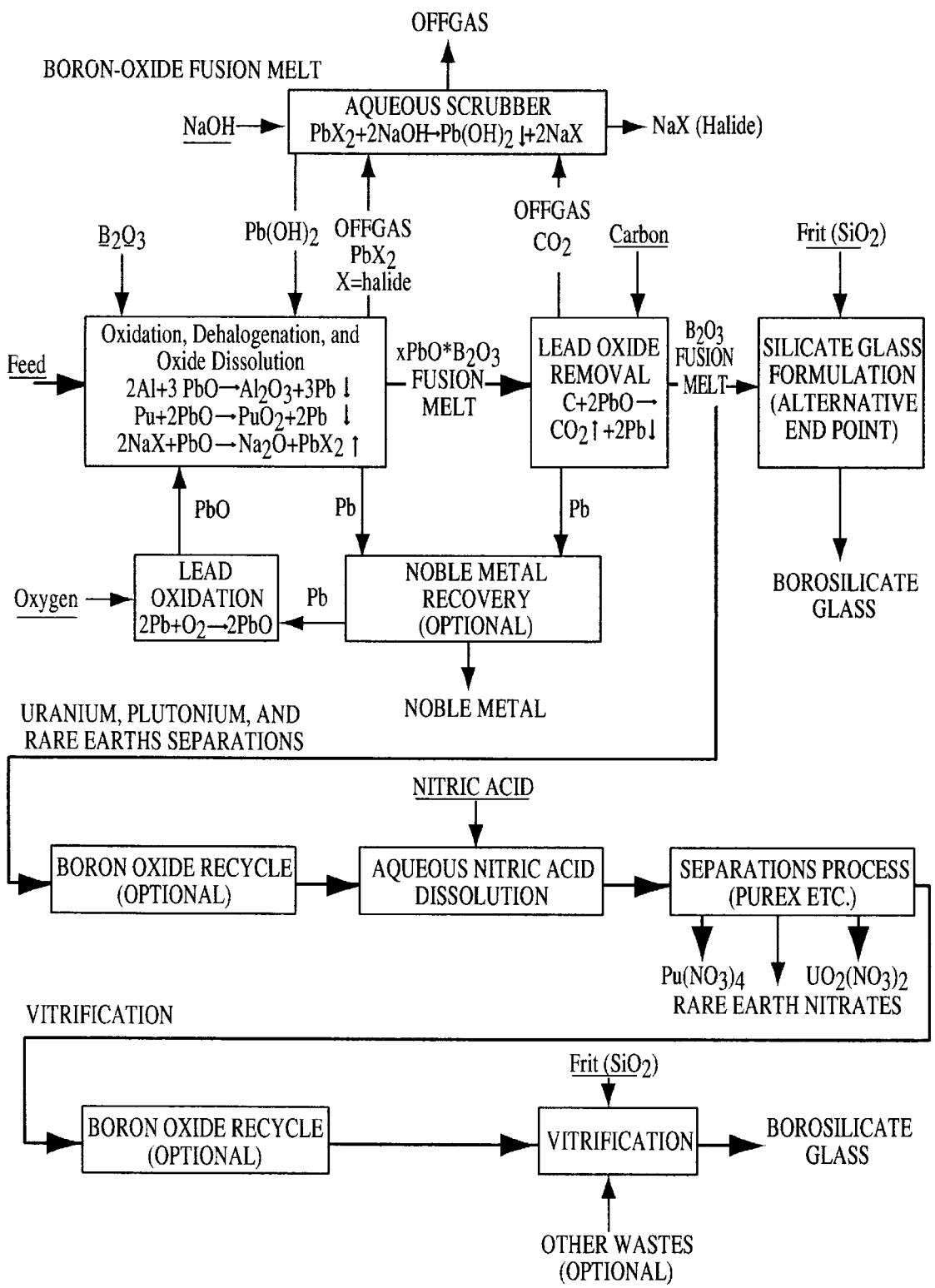
FIG. 1 is a schematic process flow diagram of the preferred embodiment of the invention wherein a boron oxide fusion melt is prepared and dissolved in nitric acid, and U, Pu and rare earth metals are separated.

The first set of steps, which converts waste feeds into a $B_2O_3$ fusion melt inside a glass melter, can be operated as a batch, semibatch, or continuous process. The initial condition for the process is a glass melter filled with a special molten oxidation-dissolution (lead borate) glass, which preferably has a composition of two or more moles of lead oxide (PbO) per mole of $B_2O_3$. The $B_2O_3$ fusion-melt operations have three steps: (1) feed oxidation, dehalogenation, and oxide dissolution; (2) PbO removal; and (3) lead oxidation. These operations can be carried out sequentially in either a single vessel or in separate process vessels. The process is best described with reference to FIG. 1, which shows a preferred embodiment of the invention.

A. Oxidation, Dehalogenation, and Oxide Dissolution of Feed Material

Lead oxide and boron oxide are added to the melter to form a dissolution glass. Nuclear waste feeds are added directly to the melter. The ceramic and amorphous components in the feed that are exposed to the molten glass rapidly dissolve into the glass. Molten glasses will generally dissolve most oxides, but the glasses do not dissolve metals or organic material (organics). To dissolve these latter components into the glass, metals and organics must first be oxidized. The PbO in the glass is a strong oxidizing agent and oxidation occurs in situ within the glass melter. If the feed contains organics, the organics are oxidized to $CO_2$, possibly CO, and steam ($H_2O$), and the by-product lead metal sinks to the bottom of the melter. The $CO_2$, CO and steam exit the melter via the off-gas system. Metals (excluding the noble metals) are oxidized by the PbO in the glass to metal oxides and, subsequently, dissolve into the glass. The lead by-product then sinks to the bottom of the melter. Typical chemical reactions are:

$2Al + 3PbO \rightarrow Al_2O_3 + 3Pb$ $Pu + 2PbO \rightarrow PuO_2 + 2Pb$ $C + 2PbO \rightarrow CO_2 + 2Pb$ $Zr + 2PbO \rightarrow ZrO_2 + 2Pb$ The dissolution glass also oxidizes sulfur-containing components to sulfur oxides that exit via the off-gas system. It is to be understood that the dissolution glass of the invention oxidizes everything in the molten mixture except the noble metals.

Rapid oxidation and dissolution are the results of the special characteristics of the $PbO:B_2O_3$ dissolution glass. At operating temperatures (700–900° C.), the PbO is a powerful oxidizer. However, some metals and other materials form protective oxide coatings. The $B_2O_3$ is an effective dissolution agent for oxides. It is used in many welding fluxes and analytical procedures for rapid dissolution of oxides. The combination of the PbO and $B_2O_3$ creates the oxidation-dissolution capabilities of this molten glass. The $2PbO:B_2O_3$ glass composition is chosen to maximize chemical reaction rates and maximize solubility of oxides in the melt.

B. Separation of Halogens from Feed Materials in the Molten Dissolution Glass

The process separates halogens within the feed during feed dissolution. Using as an example a feed containing chlorides, in the dissolution glass, chlorides in the feed will react with the PbO and form lead chlorides ($PbCl_2$), which are volatile gases at glass melter temperatures and exit to the aqueous sodium hydroxide (NaOH) scrubber. In the scrubber, the $PbCl_2$ reacts with the NaOH to yield insoluble lead hydroxide $[Pb(OH)_2]$ and soluble NaCl salt. The insoluble $Pb(OH)_2$ is recycled back to the melter, wherein it decomposes to PbO and steam. The aqueous NaCl stream is cleaned and discharged as a chemical waste. Other halogen-containing feeds behave similarly. The PbO should be present in at least a stoichiometric amount with respect to the halogens to achieve adequate removal of the halogens.

C. Removal of Noble Metals from the Molten Dissolution Glass

The noble metals are not oxidized by the PbO. During feed dissolution, the noble metals separate from the glass and dissolve into the lead metal. Noble metals are not soluble in glass but they are highly soluble in lead metal. The noble metals sink to the bottom of the melter in the lead.

The noble metals can be separated from the lead by vacuum distillation of the lead or by several other demonstrated processes. Significant quantities of noble metals are found in some lead ores in which the noble metals remain with the lead metal during smelting operations. Consequently, multiple processes for noble metal separation from lead have been developed and deployed.

D. Conversion of Molten Dissolution Glass to Borate Fusion Melt

Carbon is added to the dissolution glass. This may be done in the same melter, or the $xPbO:B_2O_3$ fusion melt (devoid of halogens) may be removed to a separate melter where carbon is then added. Carbon reduces the PbO to lead metal while gaseous $CO_2$ is produced. All of the PbO is removed from the dissolution glass to produce a $B_2O_3$ fusion melt, comprising metal oxides dissolved in $B_2O_3$. During this step, it may be necessary to supply additional $B_2O_3$, depending upon the feed material, to keep all materials in solution. The solubility limits of certain elements in the $B_2O_3$—PbO dissolution glass may be higher than in just the $B_2O_3$ without the PbO.

E. Reoxidation of the lead to PbO by Addition of Oxygen

Lead is an oxygen carrier in the dissolution process. Oxygen is injected into the molten lead recovered from the lead-borate dissolution step and recovered from the conversion of the dissolution glass to a $B_2O_3$-fusion melt, as can be seen in FIG. 1. Lead is oxidized to PbO. The oxidation reaction is:

$2\ Pb + O_2 \rightarrow 2PbO$

The PbO is recycled and used to make the next batch of lead-borate dissolution glass. The option exists to oxidize the lead in the melter by adding $O_2$ to the melter after removing the $B_2O_3$ fusion melt.

Because of the corrosive characteristics of the initial dissolution glass during the conversion of feeds to a $B_2O_3$ fusion melt, these steps in the process are best carried out in a cold-wall melter in which cooling jackets in the walls produce a "skull" of solidified material that protects the walls from the contents of the melter. The melter(s) can be heated by fossil, induction, plasma arc, or electron-beam systems. Such systems are currently used to melt high-temperature materials (e.g., titanium and superalloys) and produce specialty glasses.

F. Removal of $B_2O_3$ Fusion Melt

The resultant $B_2O_3$ fusion melt is poured from the furnace and preferably allowed to solidify before the glassy $B_2O_3$ solid is fed to the separations step. Formation of crystalline compounds during solidification is to be avoided because of their slower dissolution rates in nitric acid. The solubility of various oxides in $B_2O_3$-fusion melts is strongly dependent upon the temperature of the melt. With rapid cooling of the melt, higher loadings of oxides can remain dissolved in the $B_2O_3$ while forming a solid glassy $B_2O_3$ structure. This approach minimizes the $B_2O_3$ in the solid and reduces the volume of feed sent to the separations step. With current technology used in research reactor fuel fabrication, the option exists for rapid cooling (up to $10^6$ K/sec) and atomization of melts with uniform particles with sizes as small as 50 to 100 microns.

G. Recovery of Uranium, Plutonium and Rare Earth Elements

Processing of the radioactive waste feed material into a $B_2O_3$ fusion melt creates a solid, oxide feed that is optimized for recovering uranium, plutonium, and other elements when using acid-based separation processes such as PUREX and ion exchange.

In the process of the invention, the boron oxide fusion melt is solidified, and then dissolved in nitric acid. Prior to the dissolving, boron oxide may be recovered from the fusion melt and recycled back to the glass melter to go into the dissolution glass/waste mixture. After dissolution of the fusion melt in nitric acid, rare earth elements, U, and Pu are recovered from the acid solution by one of several processes such as PUREX or ion exchange.

H. Vitrification and Recycle of Boron Oxide

The nitric acid-boric acid waste stream resulting after the separation of U, Pu, and rare earths is converted to a waste glass, e.g., borosilicate waste glass, using the traditional vitrification processes. The waste stream is fed to a glass melter simultaneously with glass frit (primarily $SiO_2$). The nitrates are decomposed to oxides and then converted to glass. This is the standard industrial process for conversion of nitric acid wastes into a high quality waste glass.

In some cases, there may be excess $B_2O_3$ in the nitric acid-boric acid waste stream. In that event there are three options:

1) Direct Conversion to Glass

The waste can be converted to glass using added glass frit to dilute the excess $B_2O_3$ in the waste stream.

2) Mixing with Other Wastes

The waste steam can be fed to a glass melter along with other waste streams. The nitric acid stream from the acid-borate dissolution step provides the necessary $B_2O_3$ to make borosilicate glass for both waste streams. In contrast, the traditional nitric acid separation processes creates waste streams with no $B_2O_3$; hence, $B_2O_3$ must be added to these waste streams when they are being converted to borosilicate glass.

In the United States, there are large facilities to convert nitrate wastes in storage (primarily high-level radioactive wastes) to glass for disposal. These facilities are likely sites for deployment of this invention to process miscellaneous wastes. At such sites, the quantities of nitric acid wastes from processing miscellaneous wastes would be small compared to nitrate wastes that are currently being converted to glass. The $B_2O_3$-rich nitric acid wastes could be simultaneously converted to glass along with existing wastes, and the $B_2O_3$-rich acid waste could provide some of the needed $B_2O_3$ for the glass-conversion step.

3) Separation of $B_2O_3$ From Waste Stream

The $B_2O_3$ can be separated from the acid waste stream, after removal of the U, Pu and/or rare earths, and recycled back to the front of the process. There are several options for separation of $B_2O_3$ depending upon the purity desired for the $B_2O_3$. The commercial borate industry has various separation techniques. In addition, borates are used in pressurized water reactors as a soluble neutron absorber. Multiple technologies have been developed to recover borates from the reactor aqueous coolant.

System Configuration and Equipment

The $B_2O_3$ fusion-melt process steps can be configured as batch, semibatch, or continuous operation. The preferred option will depend upon the scale of operation and other factors.

In a batch operation all of the major steps (except off-gas processing) are performed in a single vessel in a sequence of four steps over a period of time. At the start of the process, $B_2O_3$ and PbO are added to the melter to form a dissolution glass. As waste feed is added to the melter, feed oxidation, dehalogenation, and oxide dissolution simultaneously occur in the molten mixture with buildup of lead metal at the bottom of the melter. After feed dissolution, carbon is added for conversion of the dissolution glass to a $B_2O_3$ fusion melt. The $B_2O_3$ fusion melt is poured from the melter and the molten lead metal is left in the bottom of the melter. The solidified $B_2O_3$ fusion melt is sent to the separations process. A new batch of dissolution glass is made in the melter by oxidizing the lead metal with $O_2$ and adding $B_2O_3$ to the melter. The cycle is then repeated. There is off-line recovery of any noble metals that build up in the lead over time.

Figure 2:
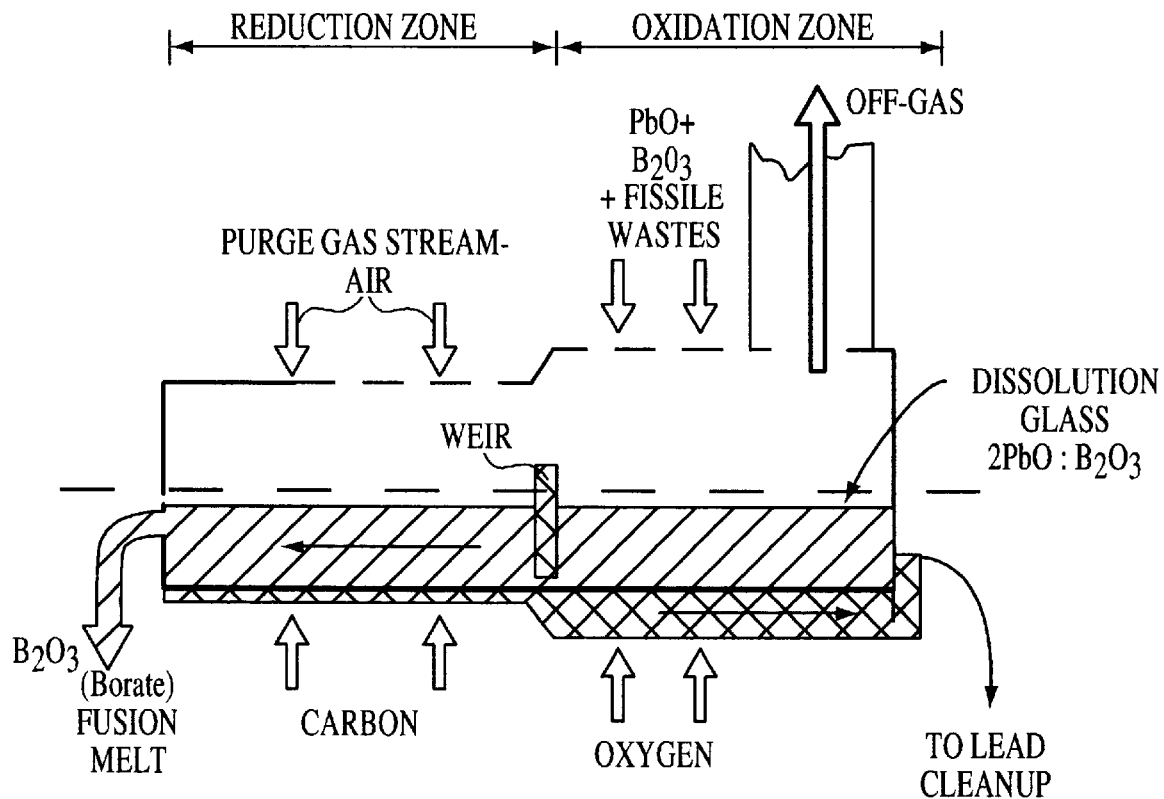
FIG. 2 is a schematic illustration of a chemical reactor for the continuous conversion of materials to a $B_2O_3$ fusion melt.

In a semibatch or continuous operation, the lead metal is drained from the melter as it is produced and it is reoxidized off-line. FIG. 2 shows a schematic drawing of a vessel used for a continuous process. There are also continuous process options for large-scale operations.

The separations and vitrification steps use existing equipment designs. The $B_2O_3$ fusion melt step is preferably carried out in a cold-wall melter because of the corrosive characteristics of the initial dissolution glass. The dissolution glass will dissolve all materials except noble metals and the molten lead will dissolve noble metals. Cold-wall melters have cooling jackets in the wall to produce a "skull" of solidified material that protects the wall from the melter contents. Cold-wall melters are used industrially to melt high-temperature materials (e.g., titanium and superalloys) and to produce ultrapure materials (e.g., glass for fiber optics). Russia, France, and the United States are modifying such equipment for processing various radioactive wastes. Batch size may be as large as hundreds of kilograms for miscellaneous fissile materials (MFMs) with low fissile material concentrations. In Europe, cold-wall melters are currently being developed for throughputs of up to 800 kg/h. There are multiple heating methods available, known to those of skill in the art.

The process of the invention produces a boron oxide fusion melt which provides a superior feed material to be used in an aqueous separations process, particularly to recover U, Pu, and rare earths from radioactive waste, industrial or other wastes. Some of the advantages of the process are:

(1) The borate fusion melt is highly soluble in acid. As the $B_2O_3$ matrix dissolves, oxides that are soluble in nitric acid dissolve.

(2) The lead-borate oxidation step destroys troubling organics and converts metals to oxides. Thus, the lead-borate processing avoids the need to use some of the nitric acid to oxidize the incoming feed materials to produce oxidized materials that are soluble in the nitric acid. For example, uranium must be fully oxidized to the +6 valence state to be highly soluble in nitric acid. Because oxidation of feeds with nitric acid usually generates large quantities of nitrogen oxides as a by-product, the pretreatment provided by the invention also reduces the size and complexity of the dissolver off-gas system.

(3) The borate fusion melt process further reduces the amount of gas generated by the dissolver off-gas system because volatile materials that would have been released in the acid dissolver are released earlier during the lead-borate dissolution process. When processing spent nuclear fuels (SNF), these volatile materials include tritiated water, xenon, and krypton.

(4) The borate fusion melt dehalogenation step eliminates troublesome halogens. These can interfere with separations and complicate engineering. Halogens mixed with nitric acid are highly corrosive and thus create major problems in terms of equipment corrosion.

Further advantages include the minimization of waste generation. Some of the features which accomplish this are:

(1) The process recycles PbO and excess $B_2O_3$ within the process. This feature minimizes final waste volumes and waste quantities.

(2) The process converts some metal components in some feeds into inert, nitric-acid-washed oxides with minimum volumes and mass that are acceptable waste forms. Separation into a clean oxide minimizes the total volume and mass of this waste.

Additionally, the process of the invention has the capability to recover key elements from the waste or convert the waste directly into borosilicate glass. The initial process steps produce a lead-borate dissolution glass. From this dissolution glass, a boron oxide fusion melt is produced that, in turn, allows recovery of valuable elements. Alternatively, the lead-borate dissolution glass can be turned into a borosilicate waste glass for direct disposal of the material as shown in FIG. 1 (the alternative end point). For some wastes, it will not be clear whether recovery of selected elements is required for waste management and/or is economically viable. Some feeds are complex, heterogeneous mixtures that are difficult and expensive to analyze. After such feeds are converted to a homogeneous lead-borate dissolution glass, simple analytical tests can determine the concentration of valuable elements in the glass. At such time, a decision can be made as to whether recovery of valuable elements is economically worthwhile.

While preferred embodiments of the present invention have been illustrated and described, it will be understood that changes and modifications can be made therein without departing from the invention in broader aspects. Various features of the invention are defined in the following claims.

I claim:

1. A method for the conversion of radioactive waste and other waste material into glass comprising the steps of:
    a) providing a bath of molten $B_2O_3$ and PbO;
    b) forming a molten dissolution glass comprising $xPbO:B_2O_3$;
    c) adding said waste to said dissolution glass to form a molten glass/waste mixture, wherein metals and metal compounds in said waste are oxidized to yield metal oxides, molten lead is formed, noble metals are dissolved in said lead, and halogens are converted to lead halides which are gases at the temperature of the molten mixture;
    d) separating said gases from said molten mixture;
    e) contacting said gases with an aqueous scrubber solution of an alkali metal hydroxide to yield a soluble alkali metal halide and a lead-containing precipitate;
    f) separating said molten lead, containing dissolved noble metals, from said molten mixture;
    g) adding carbon to said molten mixture to remove lead oxide by converting it to lead and carbon oxides;
    h) removing said carbon oxides and said lead from said molten mixture to yield a glassy boron oxide fusion melt containing dissolved metal oxides;
    i) adding said fusion melt to an aqueous nitric acid solution wherein said fusion melt, including said metal oxides in said fusion melt, are rapidly and easily dissolved in said acid solution;
    j) separating and recovering metals from said acid solution; and
    k) converting said acid solution into a waste glass.

2. The method of claim 1 wherein said lead-containing precipitate is lead hydroxide and said hydroxide is returned to said molten dissolution glass/waste mixture.

3. The method of claim 1 further comprising processing said lead formed in steps (c) and (g) to separate and recover said noble metals, oxidizing said lead to lead oxide, and returning said lead oxide to said molten dissolution glass/waste mixture.

4. The method of claim 1 further comprising allowing said boron oxide fusion melt to solidify before adding it to said nitric acid solution.

5. The method of claim 1 wherein said waste contains metals or metal compounds of one or more of plutonium, uranium, and rare earths.

6. The method of claim 5 wherein step (j) further comprises separating one or more of plutonium, uranium and rare earths as nitrates, and recovering said plutonium, uranium and rare earths.

7. The method of claim 1 further comprising recovering boron oxide from said boron oxide fusion melt formed in step (h), and reintroducing it into said molten dissolution glass/waste mixture.

8. The method of claim 1 further comprising recovering boron oxide from a boric acid-nitric acid solution formed in step (j), and reintroducing said boron oxide into the glass/waste mixture.

9. The method of claim 6 wherein glass frit is added to a boric acid-nitric acid solution remaining after one or more of said plutonium, uranium and rare earths has been removed, to produce a waste glass suitable for storage or disposal.

10. The method of claim 8 further comprising adding glass frit to said boric acid-nitric acid solution to produce a waste glass suitable for storage or disposal.

11. The method of claim 9 wherein said glass frit is $SiO_2$, and said waste glass is a borosilicate glass.

12. The method of claim 10 wherein said glass frit is $SiO_2$, and said waste glass is a non-borosilicate glass.

13. The method of claim 1 wherein said steps (a) through (h) are carried out in a cold-wall glass melter.

14. The method of claim 1 wherein the mole ratio of PbO to $B_2O_3$ is 2 to 1.

15. The method of claim 1 wherein said waste contains carbon-containing compounds, and said compounds are oxidized by said dissolution glass to form carbon oxides, and water.

16. The method of claim 5 wherein plutonium and uranium are separated from said acid solution by complexing them with tributylphosphate.

17. The method of claim 5 wherein plutonium and uranium are separated from said acid solution by ion exchange.

18. The method of claim 1 wherein said waste contains plutonium scrap and residue, spent nuclear fuel, and uranium fissile wastes.

19. The method of claim 1 wherein said PbO is present in at least a stoiciometric amount with respect to halogens in said waste material.

20. A method for recovering uranium and plutonium from plutonium residues, spent nuclear fuel, and uranium fissile wastes comprising:
    a) providing a bath of molten $B_2O_3$ and PbO;
    b) adding a waste feed material comprising carbon-containing material, halides, and plutonium and uranium in metal or compound form, to said bath to form a molten mixture of dissolution glass and waste;
    c) oxidizing said waste feed material including said carbon-containing material, plutonium and uranium;
    d) precipitating molten lead which is formed by said step of oxidizing;
    e) converting said halides to lead halides which are gases at the temperature of said molten mixture;
    f) removing said gases to an aqueous scrubber solution of an alkali metal hydroxide, wherein lead hydroxide and alkali metal halides are formed;
    h) returning said lead hydroxide to said molten mixture;
    i) adding carbon to said molten mixture to convert said lead oxide to lead and carbon oxides;
    j) removing said lead from said molten mixture wherein a glassy boron oxide fusion melt containing oxides of plutonium and uranium is formed, said fusion melt being essentially devoid of halides and carbon-containing material;
    k) solidifying said glassy boron oxide fusion melt; and
    l) dissolving said fusion melt in nitric acid, and recovering plutonium and uranium.

* * * * *